United States Patent [19]
Suzuki et al.

[11] 3,921,747
[45] Nov. 25, 1975

[54] STEERING COLUMN SUPPORT STRUCTURE FOR VEHICLES

[75] Inventors: Ichiro Suzuki; Hiroyuki Watanabe, both of Toyota, Japan

[73] Assignee: Toyota Jidosha Kogyo Kabushiki Kaisha, Japan

[22] Filed: Mar. 1, 1974

[21] Appl. No.: 447,338

[30] Foreign Application Priority Data
Mar. 10, 1973  Japan.............................. 48-28427

[52] U.S. Cl.................... 180/78; 74/492; 280/87 R
[51] Int. Cl.²..................... B60K 26/00; B62D 1/16;
[58] Field of Search ............... 74/492, 493; 180/78; 280/87 R, 87 A

[56] References Cited
UNITED STATES PATENTS

| | | | |
|---|---|---|---|
| 3,505,897 | 4/1970 | Scheffler et al........................ | 74/492 |
| 3,702,081 | 11/1972 | Arnston................................ | 74/492 |
| 3,724,286 | 4/1973 | Kitzner et al.......................... | 74/492 |
| 3,798,994 | 3/1974 | Hollins.................................. | 74/492 |
| 3,803,938 | 4/1974 | Bratke et al.......................... | 74/492 |
| 3,815,438 | 6/1974 | Johnson................................ | 74/492 |
| 3,827,710 | 8/1974 | Connell et al. .................... | 74/492 X |

*Primary Examiner*—Samuel Scott
*Assistant Examiner*—Lance W. Chandler
*Attorney, Agent, or Firm*—Stevens, Davis, Miller & Mosher

[57] ABSTRACT

A mounting structure for a steering column assembly comprising an upper and a lower column tubes telescopically coupled to each other to effect an impact energy absorbing element assembled therein by way of an axial compressive deformation of the tubes in a case of a vehicle collision. The mounting structure may have no influence from any deformation of a fire-wall of the vehicle by way of holding a lower column tube at a rearward position isolated in a given distance from the fire-wall.

6 Claims, 3 Drawing Figures

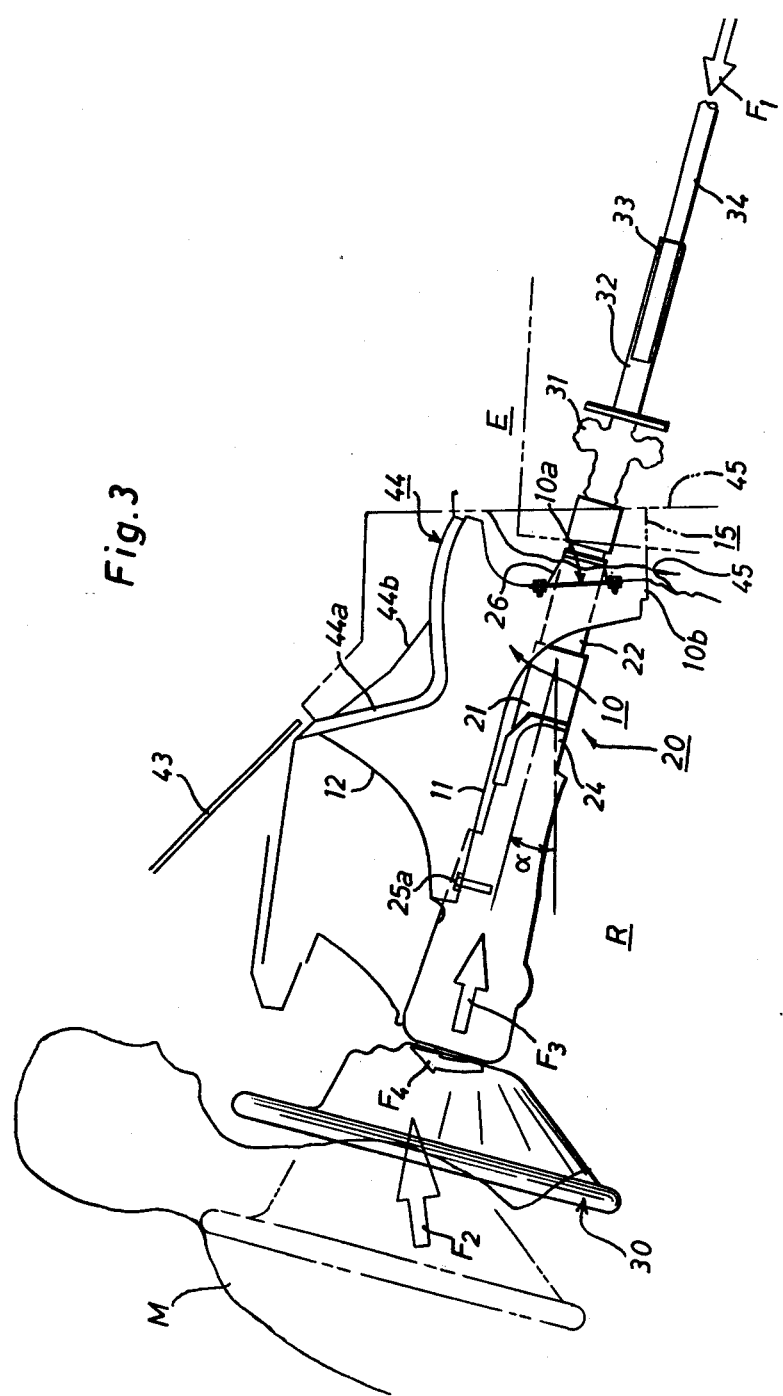

STEERING COLUMN SUPPORT STRUCTURE FOR VEHICLES

BACKGROUND OF THE INVENTION

The present invention relates to a support structure for a steering column assembly of a vehicle, and more particularly to an improved mounting structure for a steering column assembly comprising an upper and a lower column tubes telescopically coupled to each other to effect an impact energy absorbing element assembled therein by way of an axial compressive deformation of the tubes in a case of a vehicle collision.

A conventional steering column assembly of the mentioned type has been designed such that a secondary impact energy from a steering wheel caused by a vehicle operator is absorbed by the assembled energy absorbing element while the upper column tube makes its telescopical displacement against the lower column tube upon breakage of a fuse element provided at the mounting portion thereof and simultaneously the lower column tube acts as a reaction member.

The inherent problem existing with the above-mentioned conventional steering column assembly is that the mounting angle of the steering column assembly is changed by a deformation of a fire-wall located at the front end of the occupant compartment due to the engine breaking into the compartment caused by a first impact energy. The mounting angle displacement of the steering column assembly disables the function of the energy absorbing element and also the relative stroke of the column tubes is partially wasted by the deformation of the fire-wall to decrease the function of the energy absorbing element.

SUMMARY OF THE INVENTION

The main object of the present invention is to provide a steering column support structure which may have no influence from any deformation of a fire-wall of the vehicle by way of holding a lower column tube at a position spaced rearwardly in a given distance from the fire-wall, thereby to eliminate displacement of the mounting angle of the steering column assembly so as to fully function an energy absorbing element assembled with the steering column assembly and to maintain a given relative stroke of the column tubes.

Another object of the present invention is to provide a steering column support structure, having the above-mentioned characteristics, wherein a cowl panel member of the vehicle body is reinforced enough to hold the steering column support structure to assure the mounting stiffness for the steering column assembly in the normal travelling of the vehicle.

According to the present invention, there is provided a support structure for a steering column assembly which includes an upper and a lower column tubes telescopically coupled to each other for journalling a steering shaft therein, the steering shaft having an upper and a lower shafts telescopically coupled to each other, and an energy absorbing element assembled with the column assembly for absorbing a forward or second impact energy exerted thereon from a steering wheel mounted on the upper end of the steering shaft by means of the axially relative displacements of the column tubes. The steering column support structure is composed of a main support member which is securely mounted on a cowl panel member located under a front windshield of the vehicle to form a portion of the vehicle body structure and which is provided at the front end thereof with a receiving portion spaced rearwardly in a given distance from a fire-wall located in front of the occupant compartment of the vehicle to function as a reaction member, the upper column tube being releasably secured on the rear portion of the main support member and the lower column tube being rigidly supported.

BRIEF DESCRIPTION OF THE DRAWINGS

Other objects and features of the present invention will become more apparent from the description made hereinbelow with respect to a preferred embodiment thereof in conjunction with the accompanying drawings in which:

FIG. 3 depicts the steering column support structure shown in FIG. 1 but when operated in an event of a vehicle collision.

DESCRIPTION OF THE PREFERRED EMBODIMENT

Figures 1, 2:
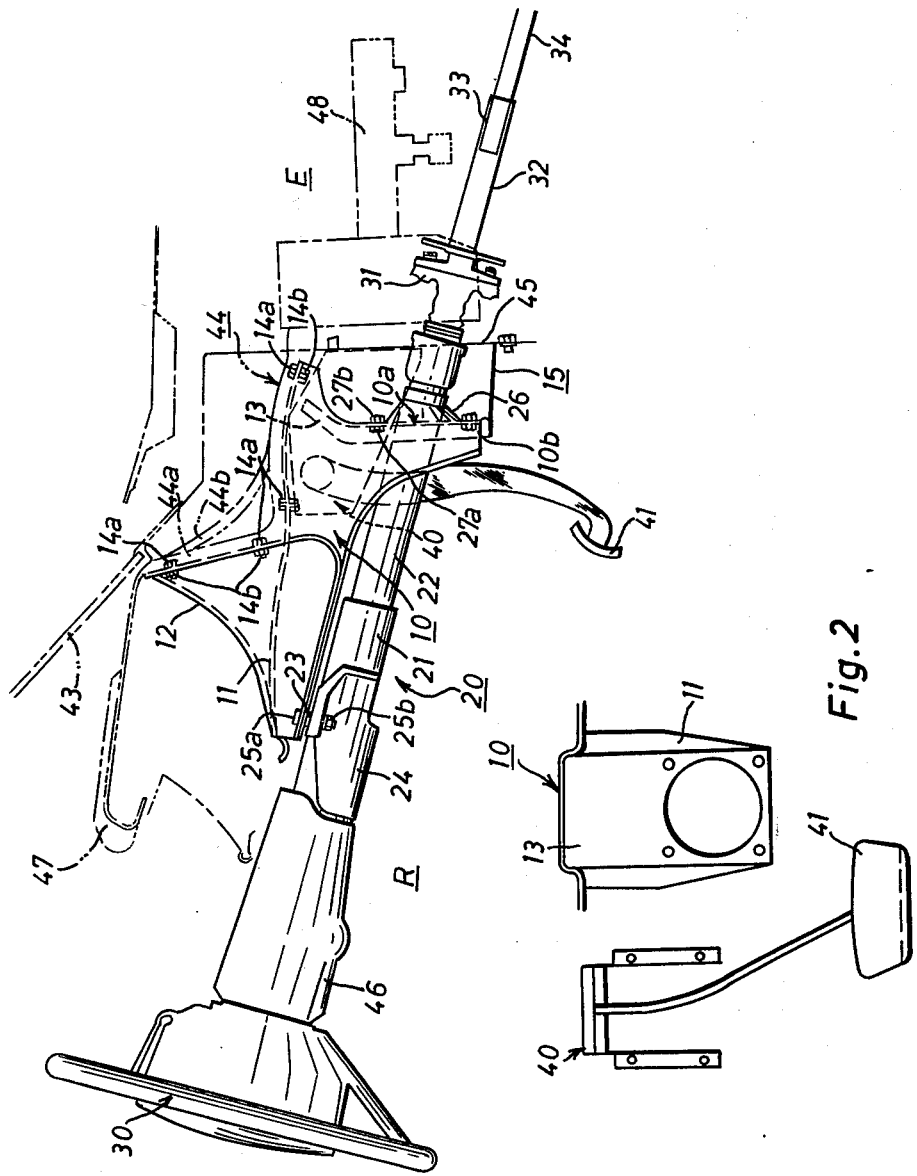
FIG. 1 is a schematic side view of a steering column support structure embodied in accordance with the present invention.
FIG. 2 shows the arrangement of a main support member and a pedal bracket seen in FIG. 1.

Referring now particularly to FIGS. 1 and 2 of the drawings, a steering column assembly 20 is supported by a steering column support structure 10 in accordance with the present invention. The steering column support structure 10 is installed on a vehicle body structure independently from a pedal bracket 40 to journal a brake pedal 41 thereon and is located at the right side of the pedal bracket 40 as viewed in FIG. 2.

The steering column support structure 10 comprises a main support member 11 with a U-shaped cross-section, a reinforcement member 12 securely mounted at its bottom portion on the rear portion of the main support member 11, and a front panel member 13 securely mounted at its both ends on the inner side walls of the front portion of the support member 11 to function as a load reaction member for the steering column assembly 20.

The main support member 11 is securely mounted at its forward portion on the bottom portion of a cowl panel 44 by means of bolts 14a and nuts 14b fastening the upper portion of the support member 11 with a pair of ribs extended parallely from the cowl panel member 44, and the reinforcement member 12 is securely mounted at its front end on the back portion of the cowl panel member 44 by means of bolts 14a and nuts 14b fastening the flanges extended laterally from the front end of the reinforcement member 12 with the ribs 44a of the cowl panel 44. The cowl panel member 44 is located under a front windshield 43 to form a portion of the vehicle body structure and is reinforced by struts 44b.

Thus, the main support member 11 is spaced at its front end 10a rearwardly in a given distance from a fire-wall 45 which is positioned at the front end of the occupant compartment R. The main support member 11 is also connected at its bottom end 10b with the fire-wall 45 by a compressible connecting plate 15 which is spanned between the fire-wall 45 and the bottom end 10b of the main support member 11 to hold the support member 11 against pulling force exerted thereon.

The steering column assembly 20 is composed of an upper and a lower column tubes 21 and 22 telescopically coupled to each other for surrounding a steering shaft (not shown) therein and an energy absorbing element assembled within the connecting portion of the column tubes 21 and 22. The upper column tube 21 is supported by a bracket 24 under the rear portion of the steering column support structure 10. The bracket 24 is fastened at its both sides on the rear portion of the main support member 11 and the reinforcement member 12 by bolts 25a and nuts 25b by way of a shearable element 23 to permit the forward displacement of the upper column tube 21 by a forward impact energy exerted on the upper portion of the steering shaft. The lower column tube 22 is provided with a conical shape bracket 26 welded thereon and firmly mounted on the load reaction member or front panel member 13 by clamping bolts 27a and nuts 27b.

The steering shaft comprises an upper shaft journalled within the upper column tube 21 and a lower shaft journalled within the lower column tube 22 and telescopically coupled with the upper shaft by way of a conventional spline connection not shown in the figure. At the top end of the upper shaft mounted is a steering wheel 30 which has an air cushion device, and the lower shaft is connected with a first extension shaft 32 by way of a flexible coupling 31. The extension shaft 32 is connected to a steering gear box (not shown) by way of a second extension shaft 34 axially displaceably connected therewith through a shearable connecting element 33. Moverover, in FIG. 1 the reference numerals 46, 47 and 48 designate respectively a column cover, an instrument panel and a master cylinder having a brake booster actuated by the brake pedal 41.

With the mentioned embodiment, in normal travelling of the vehicle, the cowl panel member 44 stands for loads acting on the steering column support structure 10 from every horizontal direction. Meanwhile, the fire-wall 45 receives the pulling force caused by loads acting on the connecting plate 15 across the support structure 10. Assured, therefore, is the necessary holding stiffness for the steering column assembly 20.

In the event of an accidental collision of the vehicle, as shown FIG. 3, an axial force represented by $F_1$ occurring along the second extension shaft 34 due to crash of the front portion of the vehicle body disconnects the shearable connecting element 33 to have the shaft 34 slide into the shaft 32. This causes the substantial disconnection between the steering shaft and the gear box. When the engine E should break into the firewall 45 unfortunately as viewed in FIG. 3, the steering column structure 10 maintains its original configuration regardless of the crash of the fire-wall 45, because the column support structure 10 is spaced rearwardly at its front end 10a in a given distance from the firewall 45 and is firmly held by the cowl panel member 44. Thus, the steering column assembly 20 maintains unchangedly the predetermined supporting angle $\alpha$ against the absolute horizontal line and position thereof even when the above-mentioned accident happens. Consequently, the load reaction member 13 remains in its position given to perform fully its operation described hereinafter.

Accordingly, when an axial force $F_3$ and a bending moment $F_4$ yield along the axial direction of the steering column assembly 20 by an inertia force $F_2$ exerted from the operator M who hits the steering wheel 30 with his body, the connection between the bracket 26 for the lower column tube 22 and the reaction member 13 is held durably against the axial force $F_3$ without any deformation thereof due to the vehicle collision. And the supporting angle $\alpha$ of the steering column assembly 20 may not be changed because of the transmission of the bending moment $F_4$ to the cowl panel 44 by way of the support structure 10. Consequently, the upper column tube 21 displaces forwardly relative to the lower column tube 22 upon disconnection of the shearable element 23 caused by the axial force $F_3$ so as to effect the assembled energy absorbing element, thereby to assure the safety of the operator M.

As the present invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A support structure for a steering column assembly comprising an upper and a lower column tubes telescopically coupled to each other for journalling a steering shaft therein, said steering shaft having an upper and a lower shafts telescopically coupled to each other, energy absorbing means assembled with said column assembly for absorbing a forward impact energy exerted thereon from a steering wheel mounted on the upper end of said steering shaft during the axially relative displacements of said column tubes, a cowl panel member located under a front windshield of the vehicle and being a portion of the vehicle body structure, and a main support member secured to said cowl panel member, said main support member having at is front end a receiving portion spaced rearwardly isolated a given distance from a firewall located in front of the occupant compartment of the vehicle to function as a load reaction member, said upper column tube being releasably secured on the rear portion of said main support member and said lower column tube being rigidly secured at its front end on said receiving portion of said main support member to insure that said lower column tube may have no influence from any deformation of the firewall.

2. A steering column support structure as set forth in claim 1, wherein a compressible connecting member is spanned between the bottom end of said receiving portion of said main support member and a portion of said fire-wall to support said main support member against pulling force exerted thereon.

3. A steering column support structure as set forth in claim 1, wherein said main support member has a U-shaped cross-section and is secured at its forward upper portion on the bottom portion of said cowl panel member and reinforced by a reinforcement member secured at its front end on the back portion of said cowl panel member and at its bottom portion on the rear portion of said main support member.

4. A steering column support structure as set forth in claim 3, wherein said receiving portion of said main support member is formed by a front panel member secured at its both ends on the inner side walls of the front portion of said main support member to function as a load reaction member for said lower column tube.

5. A steering column support structure as set forth in claim 3, wherein said main support member and said reinforcement member are secured respectively on ribs parallely extended from said cowl panel member to reinforce said steering support structure.

6. A steering column support structure as set forth in claim 1, wherein said upper column tube is secured on the rear portion of said main support member by way of a shearable element.

* * * * *